US 9,674,662 B2

(12) United States Patent
Freeland et al.

(10) Patent No.: US 9,674,662 B2
(45) Date of Patent: Jun. 6, 2017

(54) POPULATING PROPERTY VALUES OF EVENT OBJECTS OF AN OBJECT-CENTRIC DATA MODEL USING IMAGE METADATA

(71) Applicant: Palantir Technologies, Inc., Palo Alto, CA (US)

(72) Inventors: Carl Freeland, Mountain View, CA (US); Jacob Scott, Mountain View, CA (US); Eric Sadur, San Francisco, CA (US); Timothy Ronan, London (GB); Michael Kross, Palo Alto, CA (US); Huey Kwik, San Francisco, CA (US)

(73) Assignee: Palantir Technologies, Inc., Palo Alto, CA (US)

( * ) Notice: Subject to any disclaimer, the term of this patent is extended or adjusted under 35 U.S.C. 154(b) by 25 days.

(21) Appl. No.: 14/806,517

(22) Filed: Jul. 22, 2015

(65) Prior Publication Data
US 2015/0331919 A1 Nov. 19, 2015

Related U.S. Application Data

(63) Continuation of application No. 13/838,815, filed on Mar. 15, 2013, now Pat. No. 9,123,086.
(Continued)

(51) Int. Cl.
*G06K 9/46* (2006.01)
*H04W 4/02* (2009.01)
(Continued)

(52) U.S. Cl.
CPC ...... *H04W 4/023* (2013.01); *G06F 17/30247* (2013.01); *G06F 17/30265* (2013.01);
(Continued)

(58) Field of Classification Search
CPC ......... G06F 17/30247; G06F 17/30265; G06F 17/30342; G06F 17/30569; G06F 17/30607; G06T 1/00; Y10S 707/915
See application file for complete search history.

(56) References Cited

U.S. PATENT DOCUMENTS 5,021,792 A 6/1991 Hwang
5,555,503 A 9/1996 Kyrtsos et al.
(Continued)

FOREIGN PATENT DOCUMENTS

EP 2400448 12/2011
EP 2816513 12/2014
(Continued)

OTHER PUBLICATIONS

U.S. Appl. No. 13/181,392, filed Jul. 12, 2011, Notice of Allowance, Jan. 22, 2015.
(Continued)

*Primary Examiner* — Li Liu
(74) *Attorney, Agent, or Firm* — Hickman Palermo Becker Bingham LLP

(57) ABSTRACT

A mobile data analysis system is provided that enables mobile device location tracking, secure messaging, and real-time sharing of intelligence information, among other features. In one embodiment, a method and apparatus is provided for creating data objects from one or more digital images captured by a mobile device. A computing device receives a first digital image file comprising first image metadata, wherein the first image metadata includes one or more image properties each having an image property value. The computing device transforms one or more of the image property values of the one or more image properties into one or more particular values. The computing device populates one or more data object property values of a data object with
(Continued)

the one or more particular values. The computing device stores the data object in a data repository.

20 Claims, 13 Drawing Sheets

Related U.S. Application Data

(60) Provisional application No. 61/759,283, filed on Jan. 31, 2013.

(51) Int. Cl.
  *G06T 1/00* (2006.01)
  *G06F 17/30* (2006.01)
  *H04W 4/08* (2009.01)
  *H04L 29/08* (2006.01)
  *H04M 1/725* (2006.01)

(52) U.S. Cl.
  CPC .. *G06F 17/30342* (2013.01); *G06F 17/30569* (2013.01); *G06F 17/30607* (2013.01); *G06F 17/30876* (2013.01); *G06T 1/00* (2013.01); *H04L 67/18* (2013.01); *H04L 67/306* (2013.01); *H04M 1/72572* (2013.01); *H04W 4/026* (2013.01); *H04W 4/08* (2013.01); *Y10S 707/915* (2013.01)

(56) References Cited

U.S. PATENT DOCUMENTS

| | | |
|---|---|---|
| 5,670,987 A | 9/1997 | Doi et al. |
| 6,141,659 A | 10/2000 | Barker et al. |
| 6,189,003 B1 | 2/2001 | Leal |
| 6,272,489 B1 | 8/2001 | Rauch et al. |
| 6,642,945 B1 | 11/2003 | Sharpe |
| 7,188,100 B2 | 3/2007 | De Bellis et al. |
| 7,383,053 B2 | 6/2008 | Kent et al. |
| 7,523,100 B1 | 4/2009 | Bionda et al. |
| 7,529,734 B2 | 5/2009 | Dirisala |
| 7,652,622 B2 | 1/2010 | Hansen et al. |
| 7,706,817 B2 | 4/2010 | Bamrah et al. |
| 7,725,547 B2 | 5/2010 | Albertson et al. |
| 7,747,648 B1 | 6/2010 | Kraft et al. |
| 7,945,470 B1 | 5/2011 | Cohen et al. |
| 8,028,894 B2 | 10/2011 | Lapstun et al. |
| 8,402,047 B1 | 3/2013 | Mangini et al. |
| 8,477,994 B1 | 7/2013 | Noshadi |
| 8,521,135 B2 | 8/2013 | Cryderman |
| 8,739,059 B2 | 5/2014 | Rabenold et al. |
| 8,762,870 B2 | 6/2014 | Robotham et al. |
| 9,037,407 B2 | 5/2015 | Thompson |
| 2003/0152277 A1 | 8/2003 | Hall et al. |
| 2003/0227746 A1 | 12/2003 | Sato |
| 2004/0203380 A1 | 10/2004 | Hamdi et al. |
| 2005/0210409 A1 | 9/2005 | Jou |
| 2006/0116991 A1 | 6/2006 | Calderwood |
| 2006/0206235 A1 | 9/2006 | Shakes et al. |
| 2006/0250764 A1 | 11/2006 | Howarth et al. |
| 2007/0043744 A1 | 2/2007 | Carro |
| 2007/0130541 A1 | 6/2007 | Louch et al. |
| 2007/0198571 A1 | 8/2007 | Ferguson et al. |
| 2007/0250491 A1 | 10/2007 | Olszak et al. |
| 2008/0007618 A1 | 1/2008 | Yuasa |
| 2008/0025629 A1* | 1/2008 | Obrador .......... G06K 9/342 382/256 |
| 2009/0005070 A1 | 1/2009 | Forstall et al. |
| 2009/0006471 A1* | 1/2009 | Richardson ....... G06F 17/30265 |
| 2009/0006474 A1* | 1/2009 | Richardson ......... G06F 17/3028 |
| 2009/0119578 A1* | 5/2009 | Relyea .................. G06F 9/4443 715/234 |
| 2009/0138790 A1 | 5/2009 | Larcheveque et al. |
| 2009/0143052 A1 | 6/2009 | Bates |
| 2009/0156231 A1 | 6/2009 | Versteeg et al. |
| 2009/0265105 A1 | 10/2009 | Davis et al. |
| 2009/0315679 A1 | 12/2009 | Bauchot et al. |
| 2010/0073315 A1 | 3/2010 | Lee et al. |
| 2010/0082842 A1 | 4/2010 | Lavrov et al. |
| 2010/0214117 A1 | 8/2010 | Hazzani |
| 2010/0223543 A1 | 9/2010 | Marston |
| 2010/0306713 A1 | 12/2010 | Geisner et al. |
| 2011/0022312 A1 | 1/2011 | McDonough et al. |
| 2011/0158469 A1 | 6/2011 | Mastykarz |
| 2011/0202557 A1 | 8/2011 | Atsmon et al. |
| 2011/0276423 A1 | 11/2011 | Davidson |
| 2011/0310005 A1 | 12/2011 | Chen et al. |
| 2012/0014560 A1 | 1/2012 | Obrador et al. |
| 2012/0032975 A1 | 2/2012 | Koch |
| 2012/0036434 A1 | 2/2012 | Oberstein |
| 2012/0150578 A1 | 6/2012 | Mangat et al. |
| 2012/0166929 A1 | 6/2012 | Henderson et al. |
| 2012/0216106 A1 | 8/2012 | Casey |
| 2012/0268269 A1 | 10/2012 | Doyle |
| 2012/0277914 A1 | 11/2012 | Crow et al. |
| 2013/0013642 A1 | 1/2013 | Klein et al. |
| 2013/0196614 A1 | 8/2013 | Pahlevani |
| 2013/0262171 A1 | 10/2013 | Solodko et al. |
| 2013/0262497 A1 | 10/2013 | Case et al. |
| 2014/0079340 A1 | 3/2014 | Kawano |
| 2014/0093174 A1 | 4/2014 | Zhang et al. |
| 2014/0176606 A1 | 6/2014 | Narayan et al. |
| 2014/0258827 A1 | 9/2014 | Gormish et al. |
| 2014/0302783 A1 | 10/2014 | Aiuto et al. |
| 2014/0357299 A1 | 12/2014 | Xu et al. |
| 2015/0080012 A1 | 3/2015 | Sprague et al. |

FOREIGN PATENT DOCUMENTS

| | | |
|---|---|---|
| EP | 2916276 | 9/2015 |
| WO | WO 2004/038548 | 5/2004 |

OTHER PUBLICATIONS

U.S. Appl. No. 13/181,392, filed Jul. 12, 2011, Final Office Action, Aug. 28, 2014.
U.S. Appl. No. 13/831,199, filed Mar. 14, 2013, Office Action, Jun. 3, 2015.
U.S. Appl. No. 13/838,815, filed Mar. 15, 2013, Notice of Allowance, Jun. 19, 2015.
U.S. Appl. No. 13/838,815, filed Mar. 15, 2013, Notice of Allowance, Jan. 29, 2015.
U.S. Appl. No. 13/839,026, filed Mar. 15, 2013, Restriction Requirement, Apr. 2, 2015.
U.S. Appl. No. 14/027,118, filed Sep. 13, 2013, Office Action, May 12, 2015.
U.S. Appl. No. 14/088,251, filed Nov. 22, 2013, Office Action, Feb. 12, 2015.
U.S. Appl. No. 14/088,251, filed Nov. 22, 2013, Final Office Action, May 20, 2015.
U.S. Appl. No. 14/088,251, filed Nov. 22, 2013, Interview Summary, Jun. 30, 2015.
U.S. Appl. No. 14/196,814, filed Mar. 4, 2014, Office Action, May 5, 2015.
U.S. Appl. No. 14/334,232, filed Jul. 17, 2014, Office Action, Jul. 10, 2015.
U.S. Appl. No. 14/487,342, filed Sep. 16, 2014, First Office Action Interview, Apr. 23, 2015.
Official Communication for European Patent Application No. 15157642.8 dated Jul. 20, 2015.
Official Communication for New Zealand Patent Application No. 622501 dated Apr. 1, 2014.
Official Communication for New Zealand Patent Application No. 622501 dated Jun. 5, 2014.
Official Communication for European Patent Application No. 14159447.3 dated Nov. 25, 2014.
Official Communication for European Patent Application No. 14159447.3 dated Jan. 8, 2015.

(56) References Cited

OTHER PUBLICATIONS

U.S. Appl. No. 13/839,026, filed Mar. 15, 2013, Office Action, Aug. 4, 2015.

* cited by examiner

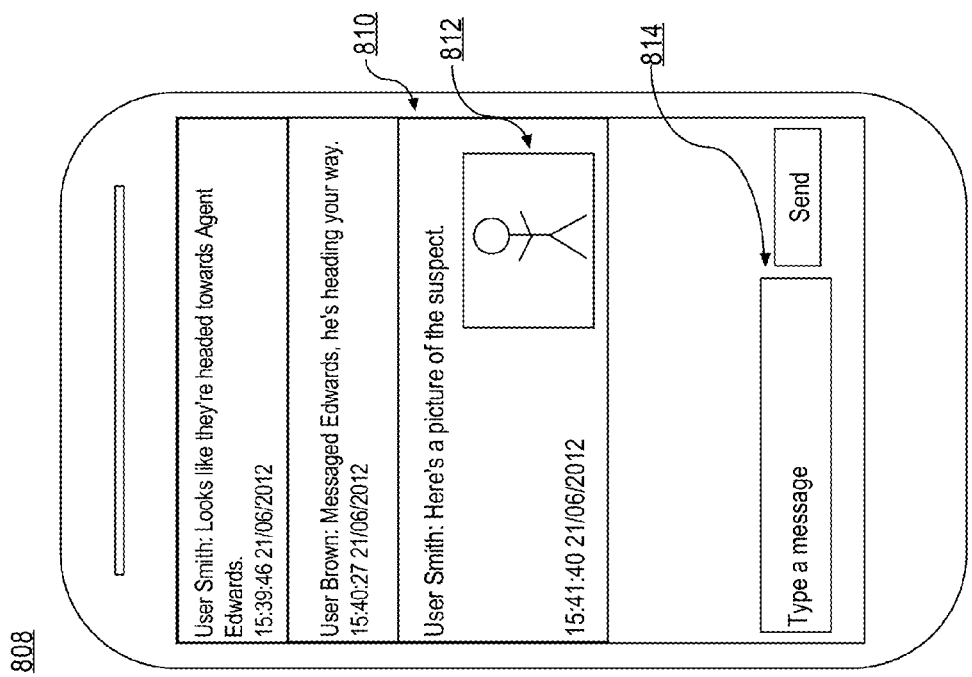
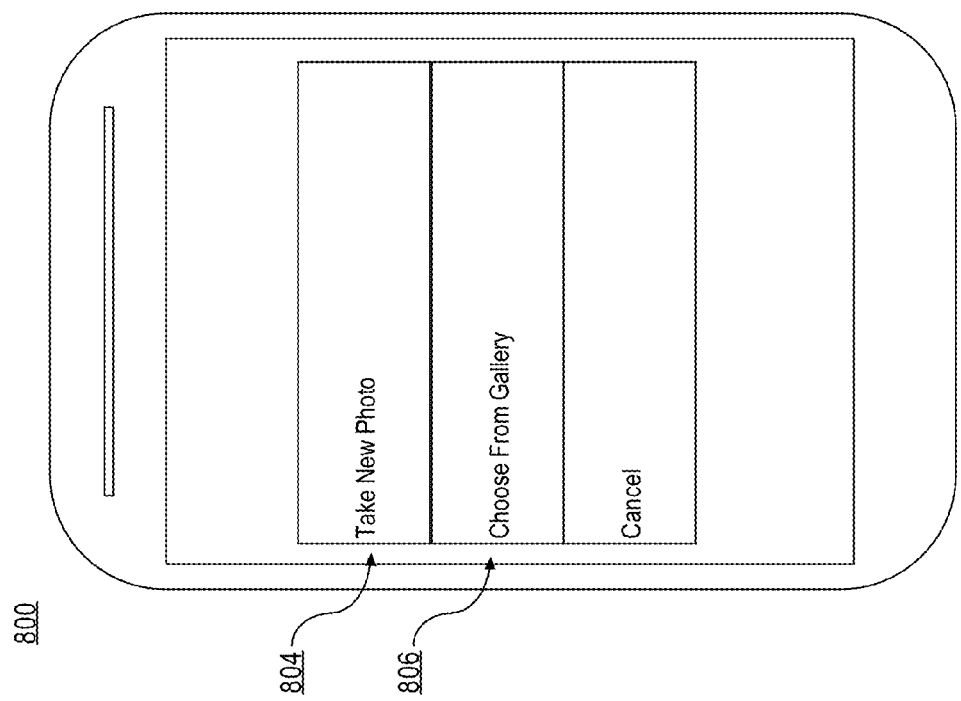

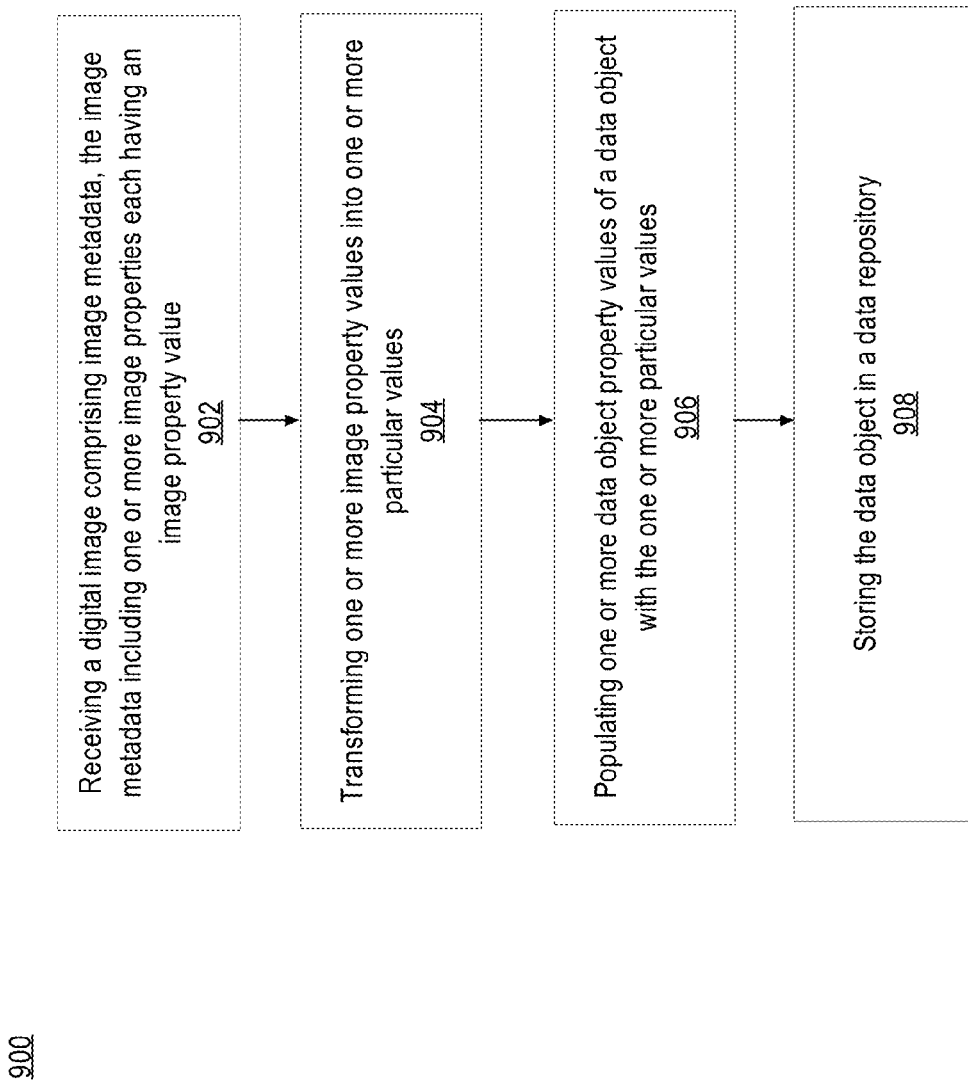

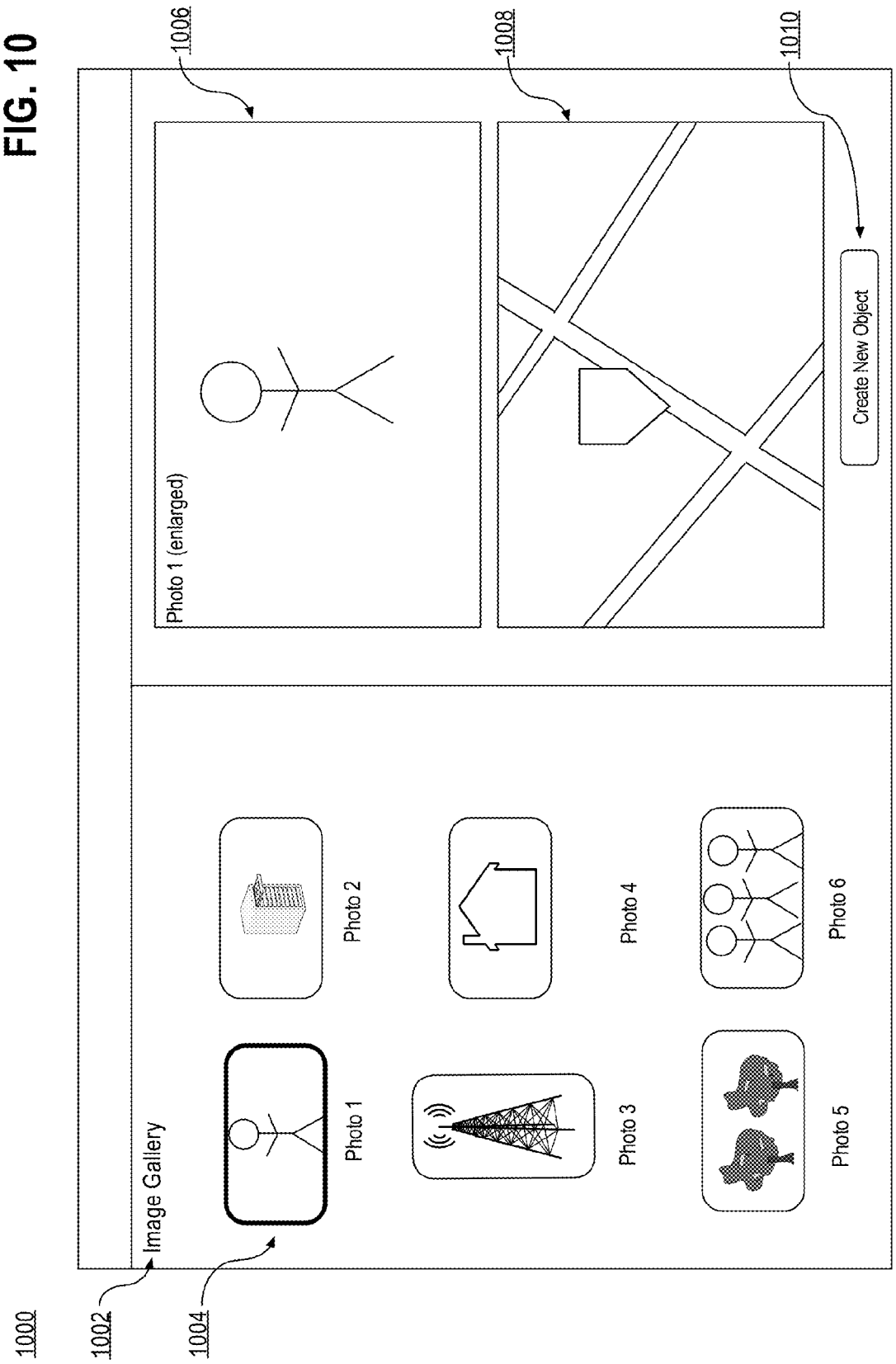

POPULATING PROPERTY VALUES OF EVENT OBJECTS OF AN OBJECT-CENTRIC DATA MODEL USING IMAGE METADATA

BENEFIT CLAIMS

This application claims the benefit under 35 U.S.C. 120 as a Continuation of application Ser. No. 13/838,815, filed Mar. 15, 2013, which claims the benefit under 35 U.S.C. §119(e) of provisional application 61/759,283, filed Jan. 31, 2013, the entire contents of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure generally relates to data analysis. The disclosure relates more specifically to a data analysis system that includes one or more mobile devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many organizations frequently conduct operations that include organization members performing activities in a dispersed geographic area. For example, the operations of a law enforcement agency typically include police officers patrolling assigned geographic areas, responding to crime scenes, and interviewing suspects and witnesses. As another example, a disaster relief organization may respond to a natural disaster by sending out aid workers to a disaster area to locate and provide assistance to those in crisis. These types of operations may be referred to as field operations and may generally include monitoring specific geographic areas and subjects, interacting with persons of interest, responding to and reporting information about the occurrence of notable events, and any other activities that an organization member may perform in the field.

In order to better coordinate field operations, an organization may employ one or more other organization members at a centralized location, referred to herein as operations analysts, that help coordinate the activities of the organization members in the field, referred to herein as field analysts. For example, operations analysts may be responsible for instructing field analysts on particular locations to investigate or subjects to monitor. Similarly, field analysts may be expected to communicate certain information related to the field operations back to operations analysts.

Both field analysts and operations analysts face a number of challenges in efficiently conducting field operations. These challenges include enabling field analysts to maintain a situational awareness of the environment in which the field analysts are operating, including maintaining an awareness of the location and activities of other field analysts. Additionally, field analysts typically lack efficient access to information that may have been previously collected and shared by other field analysts and to real-time updates of such shared information. Operations analysts similarly lack ways of maintaining a meaningful awareness of the activities of a possibly large number of field analysts for whom the operation analysts are responsible and sharing detailed information with those field analysts.

BRIEF DESCRIPTION OF THE DRAWINGS

In the drawings:

FIG. 8A, FIG. 8B illustrate example graphical user interfaces of a mobile device that are configured to enable a user to capture multimedia content on a mobile device and to send and receive multimedia content in messages.

FIG. 9 illustrates a process flow for creating a data object from a digital image.

FIG. 10 illustrates an example graphical user interface that is configured to obtain user selection one or more digital images and enable a user to create one or more data objects from the selected digital images.

DETAILED DESCRIPTION

Figure 1:
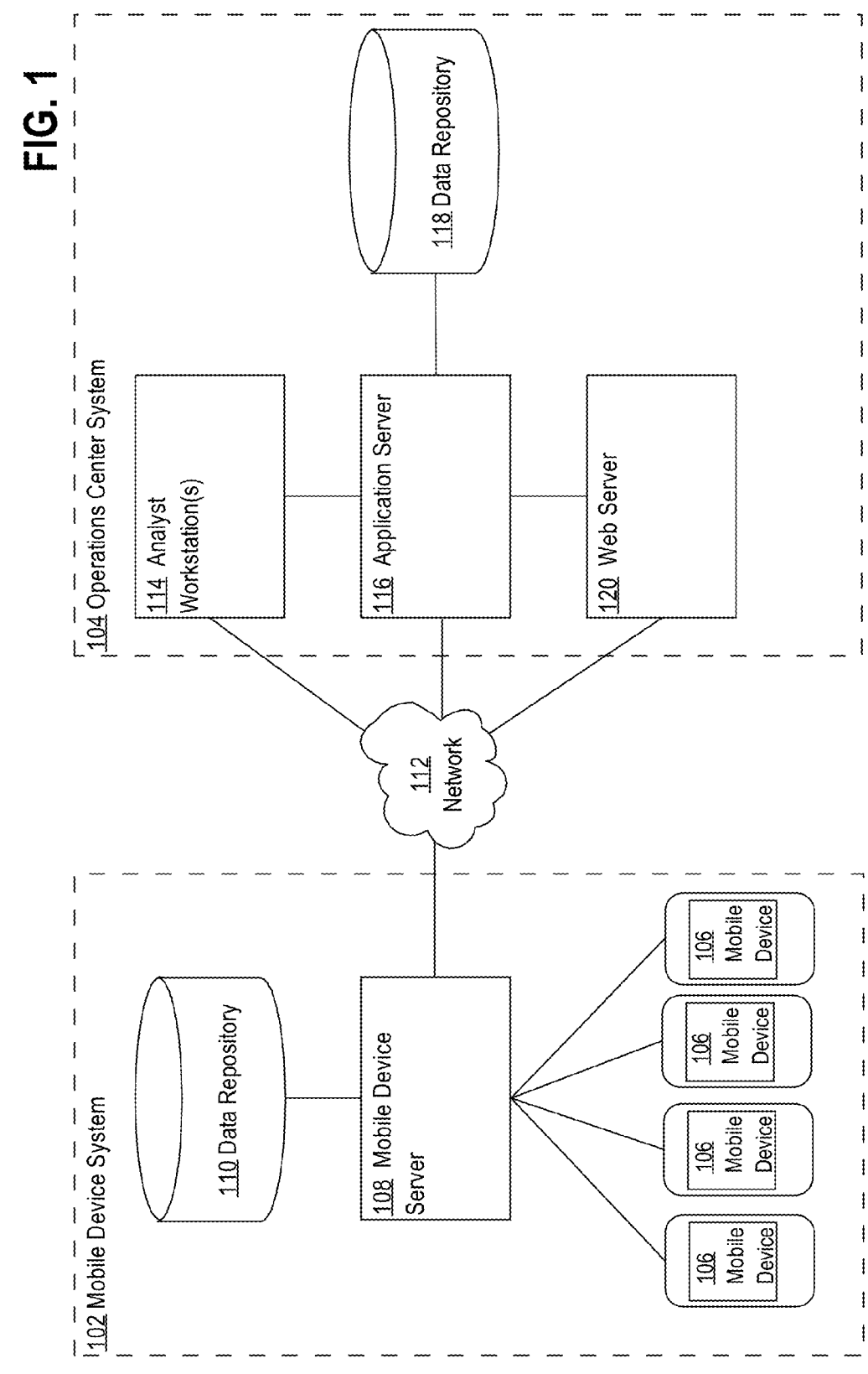
FIG. 1 illustrates an example networked computer system in accordance with an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are described herein according to the following outline:

1.0 General Overview
2.0 Structural Overview
3.0 Architectural and Functional Overview
   3.1 Mobile Device System Architecture
   3.2 Operations Center System Architecture
   3.3 Configuring Mobile Device Teams
   3.4 Mobile Device Tracking
   3.5 Mobile Device Messaging 3.6 Creating Data Objects from Images
3.7 Mobile Device Search
4.0 Implementation Mechanisms—Hardware Overview 1.0 General Overview The appended claims may serve as a summary of the invention.

According to various embodiments, a mobile data analysis system and methods are provided that enable mobile device location tracking, secure messaging, real-time data access and analysis, and other features described herein.

In an embodiment, a mobile data analysis system may comprise one or more mobile device user accounts. For example, mobile device user accounts may be created for field analysts within an organization and used by the field analysts to authenticate with the mobile data analysis system using a mobile or other computing device. In an embodiment, mobile device user accounts may be grouped into one or more mobile device teams. Mobile device user accounts may be grouped into mobile device teams based on organizational roles, areas of responsibility, or any other characteristics. In an embodiment, mobile device teams may be associated with visibility settings that control user access to information associated with mobile device user accounts of particular mobile device teams.

In an embodiment, systems and methods facilitate location tracking of mobile devices. For example, mobile devices of the mobile data analysis system may be configured to periodically report location data associated with the mobile devices to a centralized server. Field analysts using one or more mobile devices, and operations analysts using one or more workstations, may then use one or more graphical user interfaces to display the location of tracked mobile devices based on the location data sent from the mobile devices. In an embodiment, the display of tracked mobile devices in a graphical user interface for a particular user may be based on any configured mobile device teams and any associated visibility settings.

In an embodiment, systems and methods facilitate the exchange of messages between field analysts using mobile devices, and between field analysts and operations analysts using analyst workstations. Messages may be exchanged using one or more graphical user interfaces and may generally comprise any combination of text, multimedia objects, location data, data objects, and other information. In various embodiments, users may perform additional operations and data transformations based on information included in received messages.

In another embodiment, systems and methods facilitate the formulation of search requests by a user using a mobile device. In general, search requests may include requests for data objects or other information stored in the mobile data analysis system, including information generated by other users. In one embodiment, mobile device users may use one or more graphical user interfaces to formulate geosearch requests. In general, a geosearch request is a search request for data objects or other information that is associated with a user-specified geographic location or area.

According to some embodiments, systems and methods facilitate the creation of data objects from received digital images. In one embodiment, a computing device receives a first digital image file comprising first image metadata, wherein the first image metadata includes one or more image properties each having an image property value. The computing device transforms one or more of the image property values of the one or more image properties into one or more particular values. The computing device populates one or more data object property values of a data object with the one or more particular values. The computing device stores the data object in a data repository.

Other embodiments include, without limitation, a non-transitory computer-readable medium that includes processor-executable instructions that enable a processing unit to implement one or more aspects of the disclosed methods as well as a system configured to implement one or more aspects of the disclosed methods.

2.0 Structural Overview

FIG. 1 illustrates an example of a mobile data analysis system 100 in accordance with an embodiment. A mobile data analysis system 100 generally facilitates the communication and the exchange of data between one or more mobile devices (e.g., mobile devices 106), one or more analyst workstations (e.g., analyst workstations 114), and information stored in one or more data repositories (e.g., data repositories 110, 118). The example mobile data analysis system 100 is conceptually described herein as comprising a mobile device system 102 supporting one or more mobile devices 106 and that is interconnected over a network 112 to an operations center system 104 supporting one or more analyst workstations 114 and other computing resources; however, the mobile data analysis system 100 represents just one system arrangement and other system arrangements are possible.

In an embodiment, a mobile device system 102 comprises mobile devices 106, mobile device server 108, and data repository 110. Each of mobile devices 106 generally may comprise any mobile computing device including, without limitation, a smartphone, a cellular phone, a tablet, a laptop, and a personal digital assistant (PDA). Each of mobile devices 106 is communicatively coupled to mobile device server 108 via one or more wireless links that may include, for example, cellular, Wi-Fi, WiMAX, ZigBee, microwave, and other wireless network links. For the purposes of illustrating a clear example, four mobile devices 106 and one mobile device server 108 are shown in FIG. 1, but practical implementations may use hundreds or thousands of mobile devices and any number of mobile devices servers.

In an embodiment, mobile device server 108 may be communicatively coupled to resources of operations center system 104 via network 112, which broadly represents one or more local area networks, wide area networks, global interconnected internetworks such as the public internet, or a combination thereof. Mobile device server 108 generally may be configured to coordinate communication between mobile devices 106 and resources of operations center system 104 and to access and retrieve data stored in data repository 110. For example, mobile device server 108 may be configured to relay search requests, messages, and other data sent from mobile devices 106 to resources of operations center system 104, and to send information received from operations center system 104 to the appropriate mobile devices 106.

In an embodiment, operations center system 104 comprises one or more analyst workstations 114, application server 116, data repository 118, and web server 120. One or more components of operations center system 104 may, for example, be located in a centralized location that is remote from mobile device system 102 and mobile devices 106.

In an embodiment, analyst workstations 114 comprise one or more workstation computers, server computers, laptop computers, mobile devices, or combinations thereof. Analyst workstations 114 generally are configured to support one or more operations analysts that may request information provided by application server 116 and/or web server 120, send information to application server 116 to be stored in data repository 118, communicate with one or more field analysts using mobile devices 106, and perform other operations described herein.

In an embodiment, application server 116 generally is configured to access and retrieve data stored in data repository 118 in response to requests from mobile devices 106, mobile device server 108, analyst workstations 114, and web server 120. Application server 116 may perform data manipulations and other operations in response to receiving requests to access and/or store data in data repository 118.

3.0 Architectural and Functional Overview 3.1 Mobile Device System Architecture

Figure 2:
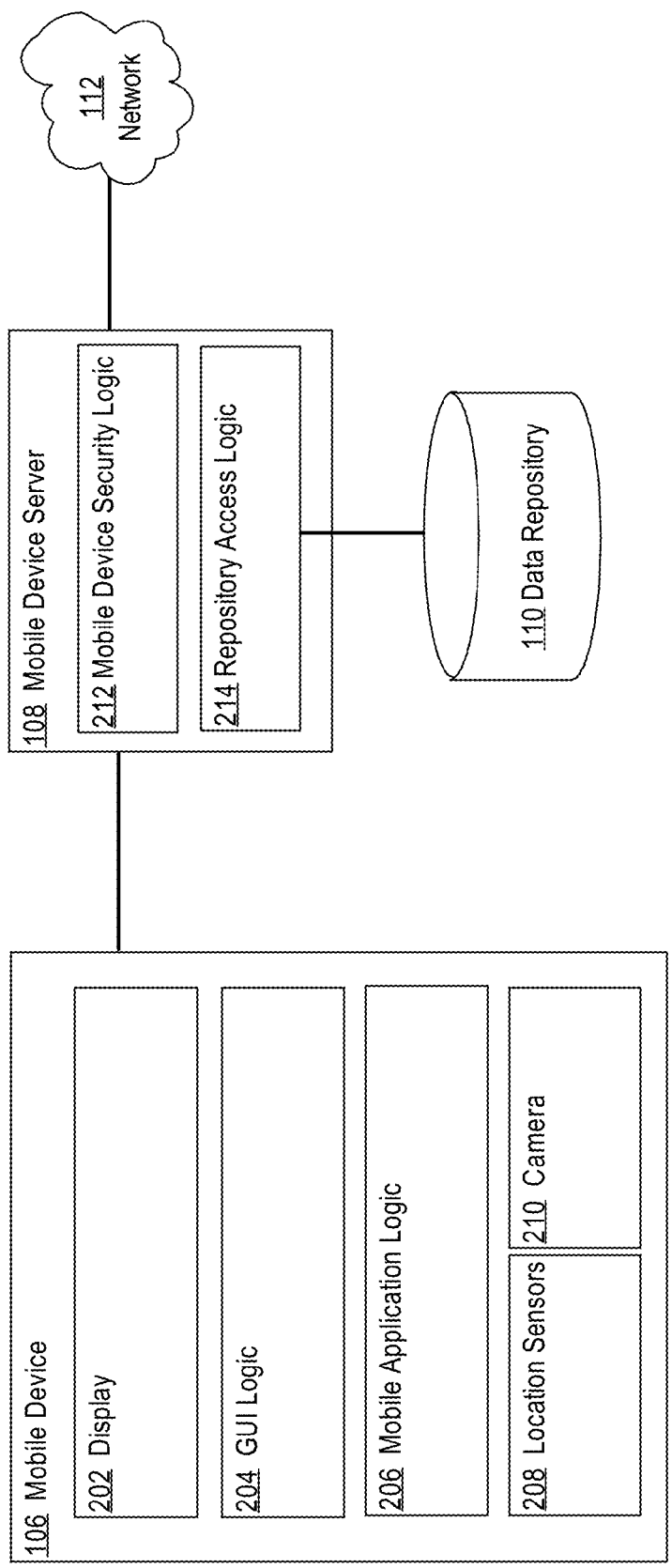
FIG. 2 illustrates an example mobile device system in accordance with an embodiment.

FIG. 2 illustrates an example mobile device system architecture 200. In an embodiment, a mobile device system architecture 200 comprises one or more mobile devices 106, mobile device server 108, and data repository 110.

In the embodiment illustrated in FIG. 2, a mobile device 106, which may be implemented by one or more physical computing devices, is communicatively coupled to mobile device server 108, which may be implemented by one or more second physical computing devices, over one or more wireless networks. A mobile device 106 comprises a display 202, graphical user interface (GUI) logic 204, mobile application logic 206, location sensors 208, and camera 210.

In an embodiment, GUI logic 204 may be a set of program instructions which, when executed by one or more processors of a mobile device 106, are operable to receive user input and to display a graphical representation of one or more graphic constructs related to the mobile data analysis system approaches described herein. As an example, a mobile device 106 may be a smartphone and GUI logic 204 may be operable to receive touch screen signals and other user input from, and display the graphics constructs to, a graphical user interface that is provided on display 202. Touch screen signals may comprise selecting buttons, holding down buttons, selecting items displayed on the screen, dragging, or other gestures or selections. In general, GUI logic 204 is configured to receive user input and determine what user requests or commands are represented by the user input.

In an embodiment, a mobile device 106 includes mobile application logic 206, which may comprise firmware, hardware, software, or a combination thereof in various embodiments that is configured to implement the functions of a mobile data analysis system on a mobile device as described herein. In one embodiment, mobile application logic 206 may be implemented as part of an application program configured to execute on the Android operating system. In other embodiments, mobile application logic 206 may be implemented as a combination of programming instructions written in any programming language (e.g., C++ or Java) and hardware components (e.g. memory, CPU time) that have been allocated for executing the program instructions on a mobile device 106.

In an embodiment, location sensors 208 generally represent any sensors which may be used to determine information associated with a geographic location, spatial orientation, device movement, or any other information associated with the physical presence of a mobile device 106, and which may be referred to herein as location data. Location data may include, for example, latitudinal and longitudinal coordinates, elevation measures, cardinal direction information, movement information, etc. For example, location sensors 208 may comprise a Global Positioning System (GPS) component, motion sensors (e.g., an accelerometer), rotation sensors (e.g., a gyroscope), a compass, and a magnetometer. In an embodiment, mobile application logic 206 is operable to receive location data from location sensors 208 and to send the location data to a mobile device server 108, which in turn may send the location data to resources of operations center system 104. The receiving and sending of location data by mobile application logic 206 may be performed periodically, at user configured intervals, or based on any other schedule.

In an embodiment, camera 210 generally represents any component capable of capturing multimedia information such as images, video, and sound. Camera 210 may be integrated into a mobile device 106 or may be an external device communicatively coupled to a mobile device 106.

In an embodiment, mobile device server 108 comprises mobile device security logic 212 and repository access logic 214.

In an embodiment, mobile device security logic 212 provides processes for controlling access to the mobile data analysis system by mobile devices. For example, access by mobile devices 106 to mobile device server 108, and via mobile device server 108 to resources of operations center system 104 over network 112, may be restricted and/or secured. As such, access by a mobile device user to a mobile device 106 and/or mobile device server 108 may be based on the user supplying an authorized mobile device user account and associated passwords, secret questions, personal identification numbers (PINs), biometrics, and/or any other suitable authentication mechanism. Mobile device security logic 212 comprise a set of program instructions configured to process mobile device user login requests sent from a mobile device 106.

In one embodiment, user access to a mobile device 106, mobile device server 108, and one or more of the resources of operations center system 104 may be protected by separate authentication mechanisms. In another embodiment, mobile device security logic 212 may be configured to implement a Single Sign-On (SSO) access control system in order to provide a single point of authentication for mobile device users. An SSO access control system generally enables a system resource, such as mobile device server 108, to process access credentials supplied by a mobile device user and, if a successful login occurs, to grant an authenticated user account access to resources located on other system resources, such as the resources of operations center system 104, and without the mobile user manually authenticating with the other systems.

In an embodiment, communication between mobile devices 106, mobile device server 108, and resources in operations center system 104 may be secured using a cryptographic communication protocol such as, for example, the Secure Sockets Layer (SSL) protocol. For example, each of mobile devices 106 may be configured for secure communications by installing a public key security certificate on the mobile devices and a corresponding private key security certificate on mobile device server 108 and resources of operations center system 104. Mobile device security logic 212 may comprise instructions configured to send and receive encrypted network traffic based on the installed security certificates, whereby the mobile device security logic 212 encodes outgoing data with the public key security certificate, and mobile devices server 108 and/or resources of operations center system 104 decode received data with the installed private key security certificates.

In an embodiment, mobile device security logic 212 may comprise program instructions configured to restrict mobile device access to mobile device server 108 based on a whitelist of authorized mobile devices. A mobile device whitelist may be configured by a mobile data analysis system administrator and may include, for example, one or more entries that specify a unique identifier associated with approved mobile devices. The unique identifier may be, for example, a device serial number, an international mobile equipment identity (IMEI) number, a MAC address, or any other identifier that may be transmitted by a mobile device 106 to mobile device server 108. In an embodiment, mobile device security logic 212 may be configured to cause mobile device server 108 to ignore requests that are sent from a mobile device that does not supply an identifier on the whitelist. A mobile device whitelist may be stored in a database, a spreadsheet, or any other suitable format for storage in a data repository such as data repository 110.

In an embodiment, mobile device server 108 comprises repository access logic 214. Repository access logic 214 may comprise a set of instructions which, when executed by one or more processors, are operable to access and retrieve data from data repository 118. For example, repository access logic may be a database client or an Open Database Connectivity (ODBC) client that supports calls to a database server that manages data repository 118.

In an embodiment, data repository 110 generally represents any data storage device (e.g., local memory on mobile device server 108, shared memory, a database, etc.) known in the art which may be configured to store data. In an embodiment, data repository 110 may store, for example, configuration files, security information, and other data associated with mobile devices 106. In some embodiments, data stored in data repository 110 may be accessed by mobile device server 108 in order to avoid sending requests for the same information to resources of operations center system 104.

3.2 Operations Center System Architecture

Figure 3:
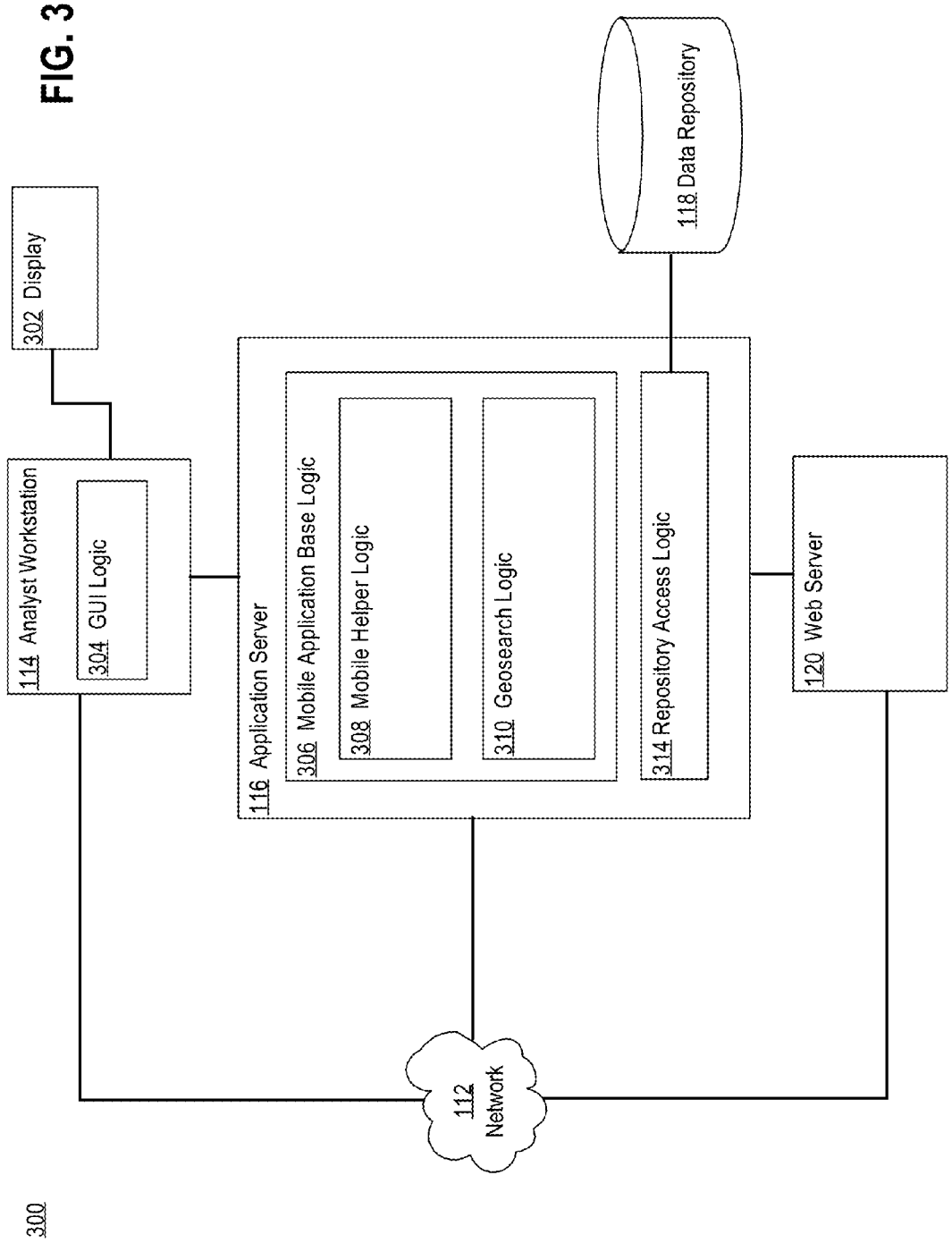
FIG. 3 illustrates an example operations center system in accordance with an embodiment.

FIG. 3 illustrates an example operations center architecture 300. In an embodiment, operations center architecture 300 comprises application server 116, web server 120, and one or more analyst workstations, such as analyst workstation 114.

In the embodiment illustrated in FIG. 3, analyst workstation 114, which may be implemented by one or more physical computing devices, is communicatively connected to application server 116 and web server 120, which may be implemented by one or more other physical computing devices, over a network. In some embodiments, each such physical computing device may be implemented as a separate computer system. For example, analyst workstation 114 may be implemented in a computer system as a set of program instructions recorded on a machine-readable storage medium, while application server 116 and web server 120 may be implemented in different computer systems.

Analyst workstation 114 comprises graphical user interface (GUI) logic 304. GUI logic 304 may be a set of program instructions which, when executed by one or more processors of the computer system, are operable to receive user input and display a graphical representation of one or more graphic constructs related to the mobile data analysis approaches described herein. GUI logic 304 may be operable to receive user input from, and display the graphic constructs to, a graphical user interface that is provided on display 302 by the computer system on which analyst workstation 114 executes.

Analyst workstation 114 may also interact with application server 116 to provide input, definition, editing instructions, and expressions related to a mobile data analysis system as described herein using a programmatic interface, and then the application server 116 may use, process, log, store, or otherwise interact with the received input according to application server logic.

In an embodiment, web server 120 is configured to provide one or more web-based interfaces to resources available from application server 116 and data repository 118. As an example, one or more of mobile devices 106 may comprise a browser that can access HTML documents that web server 120 generates. The web pages may include information about data stored in data repository 118. In other embodiments, web server 120 may use formats other than HTML for transmitting information to requesting devices.

In an embodiment, application server 116 may be implemented as a special-purpose computer system having the logical elements shown in FIG. 3. In an embodiment, the logical elements may comprise program instructions recorded on one or more machine-readable storage media. Alternatively, the logical elements may be implemented in hardware, firmware, or a combination.

When executed by one or more processors of the computer system, logic in application server 116 is operable to perform mobile data analysis system operations according to the techniques described herein. In one embodiment, logic in application server 116 may be implemented in a Java Virtual Machine (JVM) that is executing in a distributed or non-distributed computer system. In other embodiments, logic in application server 116 may be implemented as a combination of programming instructions written in any programming language (e.g., C++ or Visual Basic) and hardware components (e.g., memory, CPU time) that have been allocated for executing the program instructions.

In an embodiment, application server 116 comprises repository access logic 314. Repository access logic 314 may comprise a set of instructions which, when executed by one or more processors, are operable to access and retrieve data from data repository 118.

In an embodiment, data repository 118 may be a type of structured storage for storing data including, but not limited to, relational or object-oriented databases, data warehouses, directories, data files, and any other structured data storage. In one embodiment, data repository 118 is implemented as a revisioning database system configured to track changes made to data stored in the data repository. In an embodiment, a revisioning database system records metadata about changes to stored data, facilitates UNDO and REDO operations of data changes, can receive requests to subscribe to particular data and publish updates to such data for delivery to subscribers, and perform other functions.

In an embodiment, data stored in data repository 118 is conceptually structured according to an object-centric data model, the data model consisting of a collection of data objects. For example, a data object in the data model may represent an entity such as a person, a place, an organization, an event, a document, or a digital media item such as audio or video. A data object may have a type (e.g., Person, Event, Organization) and include any number of data property fields and corresponding data property values. For example, Event data objects may have data property fields for storing information associated with a particular events represented by the data objects such as, for example, a date and time of an event, a location of an event, etc.

In one embodiment, data objects in the data model may be represented as a data object graph consisting of nodes and edges. The nodes of the graph may represent data objects and the edges may represent relationships or other links between data objects. For example, a particular person, represented by a Person data object, may be known to have an affiliation with a particular organization, represented by an Organization data object. The relationship between the person and the organization may be represented by an edge in the data object graph between the Person data object and the Organization data object. An edge between two data object nodes may be represented and stored in various embodiments as a data object property value of one or more of the connected nodes, or as a separate data entity.

In an embodiment, application server 116 comprises mobile application base logic 306. Mobile application base logic 306 generally includes logic implementing mobile data analysis system operations that may be requested by an analyst workstation 114 and mobile devices 106 and comprises mobile helper logic 308 and geosearch logic 310.

In an embodiment, mobile helper logic 308 provides processes for assisting users to observe the location of one or more mobile devices on a map display. Mobile helper logic mobile device security logic 212 may comprise program instructions operable to receive and store locational and other data sent from mobile devices and to provide locational and other data in response to requests. The data received, stored, and sent may further include metadata. Mobile helper logic 308 may further comprise logic operable to transmit messages sent from mobile device and analyst workstation users, perform data object searches, and other functionality described herein.

In an embodiment, geosearch logic 310 provides processes for handling geosearch requests sent from a mobile device and analyst workstation users. In general, a geosearch request is a search request for data objects or other information that is associated with one or more specified geographic locations or areas. Examples of processing geosearch requests are described in a separate section herein.

3.3 Configuring Mobile Device Teams

For the purposes of clearly illustrating how the functions described herein operate, the following sections describe example graphical user interface displays for the described mobile data analysis system features. However, the graphical user interface displays described herein represent only selected examples of visualizations for the mobile data analysis system operations that are described herein. Thus, the disclosure broadly encompasses any methods of operating a mobile analysis system that are described herein.

Further, no particular graphical user interface is required and the disclosure is intended to encompass processing approaches for a mobile analysis system that are described independent of any graphical user interface, and it is not intended to be limited to any particular graphical user interface or other form of display. For example, the example graphical user interfaces merely represent one way for an analyst workstation user to view the location of one or more mobile devices on a map, to send and receive messages on a mobile device, and to view images received from a mobile device at an analyst workstation; in other embodiments, programmatic methods may be used to obtain the same information and other forms of data output may be used such as logging, reporting, storing in database tables, storing in spreadsheets, etc.

In an embodiment, mobile device user accounts of a mobile data analysis system may be grouped into one or more mobile device teams. In this context, mobile device user accounts may comprise information associated with a particular user in the mobile data analysis system including, for example, a user name, passwords, and other user settings, and enable users to authenticate with the mobile data analysis system. For example, a field analyst may provide an assigned user name and password at a mobile device in order to be granted access to use the resources of the mobile data analysis system from the mobile device. A mobile device team is a logical grouping of one or more mobile device accounts, and by extension the mobile device users associated with the mobile device user accounts. A mobile device team may be based on organizational, operational, or any other characteristics that define one or more groupings of users within an organization. For example, a law enforcement agency may group mobile device user accounts that have been created for police officers in the agency into one or more mobile device teams based on geographic areas of responsibility, organization roles (e.g., special weapons and tactics, bomb squad, K-9 unit, etc.), security access levels, or other such groupings.

Figure 4:
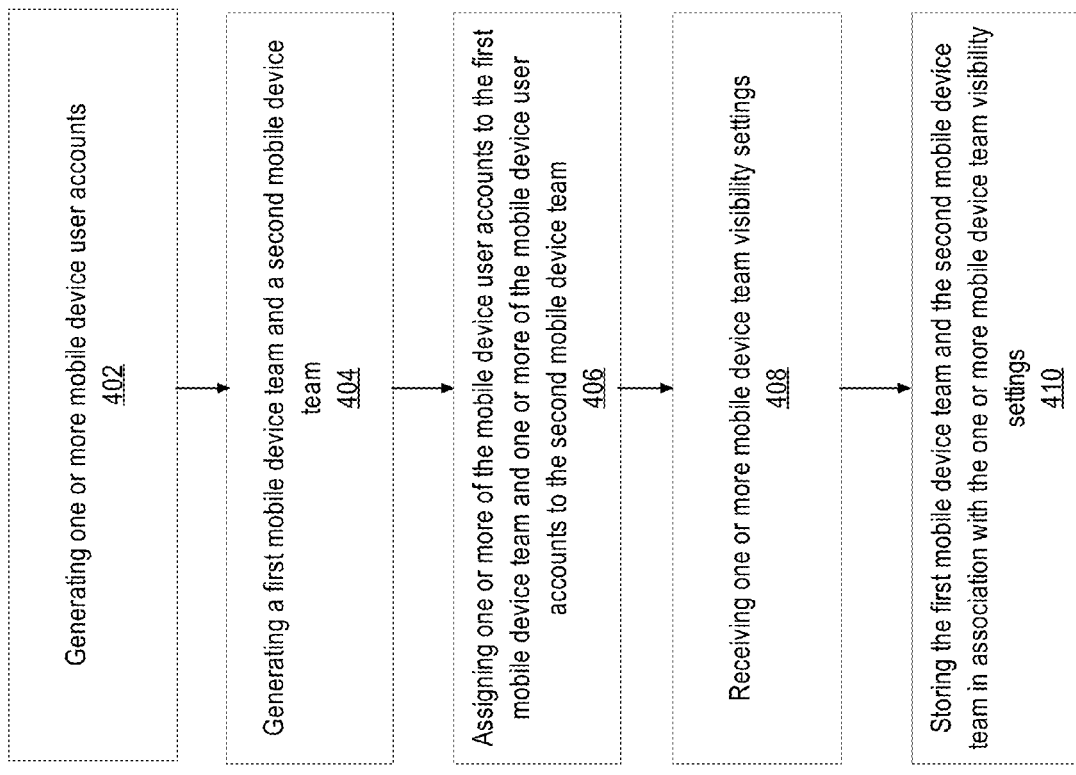
FIG. 4 illustrates a process flow for generating one or more mobile device teams and mobile device team visibility settings.

In an embodiment, mobile device teams may be associated with one or more visibility settings. Visibility settings for a particular mobile device team may control which other users are able to view information associated with the particular mobile device team including associated location data, messages, and other team-centric information. FIG. 4 illustrates an example process flow 400 for generating one or more mobile device teams and mobile device team visibility settings. In an embodiment, one or more of the steps below may be omitted, repeated, or performed in a different order. The specific arrangement shown in FIG. 4 is not required.

In Step 402, one or more mobile device user accounts are generated. For example, a separate mobile device user account may be generated for each field analyst in an organization using an approved mobile device in the mobile data analysis system. In an embodiment, an input mechanism is provided for a system administrator or other user to enter commands for the purposes of generating mobile device user accounts. Here, the term "input mechanism" includes either a command line interaction mechanism or a graphical user interface based interaction mechanism, or a combination of the preceding two. For example, a command may be issued by a user at an analyst work station 114 and received by application server 116 and, in response, application server 116 may generate and store the one or more mobile device user accounts in a repository, such as data repository 118. In another embodiment, mobile device user account information for one or more mobile device user accounts may be received by an application server in the form of an account configuration file, for example, in an XML file or other structured document format.

In Step 404, a first mobile device team and a second mobile device team are generated. For example, an authorized user using an analyst workstation may issue one or more additional commands to create two new mobile device teams. The user may associate a label for each of the new teams, for example, the first mobile device team may be labeled the "Green" team and the second mobile device team may be labeled the "Blue" team. The mobile device team labels may be used for the purposes of identifying a mobile device team in other graphical user interfaces of the mobile device system. For the purposes of illustrating a clear example, only two mobile device teams are generated; however, in other embodiments any number of mobile device teams may be generated.

In Step 406, one or more of the mobile device user accounts are assigned to the first mobile device team and one or more of the mobile device user accounts are assigned to the second mobile device team. For example, a user may issue a command that specifies one or more of the generated mobile device user accounts and a mobile device team, the command indicating that the specified mobile device user accounts are to be assigned to the specified mobile device team. In an embodiment, a particular mobile device user account may be assigned to any number of different mobile device teams. The mobile device user account information and mobile device team information may be stored in one or more configuration files, database tables, or in any other suitable format in a data repository, such as data repository 118.

In Step 408, one or more mobile device team visibility settings are received. In this context, mobile device team visibility settings comprise one or more configuration settings indicating whether mobile device user accounts of particular mobile device teams are permitted access to view information associated with mobile device user accounts of other mobile device teams. For example, visibility settings may be used to manage a mobile device user's ability to view other mobile device user accounts and associated locational data on map displays, to send messages to other mobile device user accounts, and access other data associated with other mobile device user accounts. As used herein, indicating that first mobile device team is visible to a second mobile device team means that mobile device users of the second mobile device team are permitted to access and view information associated with mobile device user accounts of the first mobile device team.

In an embodiment, mobile device team visibility settings may be received by an application server as commands input by a user. Using the example mobile device teams Green and Blue generated above, a user may issue a first command that specifies that the Blue mobile team is visible to the Green mobile device team. The user may issue a second command that specifies that the Green mobile device team is not visible to the Blue mobile device team. As a result, mobile device user accounts associated with the Green mobile device team may be able to access and view information about mobile device user accounts associated with the Blue mobile device team. In contrast, mobile device user accounts associated with the Blue mobile device team may be prevented from viewing information associated with the Green mobile device team. In an embodiment, mobile device team visibility settings may also be configured on an individual mobile device user account basis. For example, a user may issue a command indicating that a particular mobile device team is or is not visible to a particular mobile device user account.

In Step 410, mobile device team visibility settings are stored in association with the first mobile device team and the second mobile device team, for example, in data repository 118.

3.4 Mobile Device Tracking

In one embodiment, a mobile data analysis system is configured to track the location and movement of one or more mobile devices and, by extension, the mobile device users using the tracked mobile devices. Tracking the location of mobile devices may be of interest to both mobile device users (e.g., field analysts) using the tracked mobile devices, and to analyst workstation users (e.g., operations analysts) that may be coordinating the activities of the mobile device users. As such, logic in both mobile devices 106 and analyst workstations 114 may be configured to receive and display location data associated with one or more tracked mobile devices.

Figure 5:
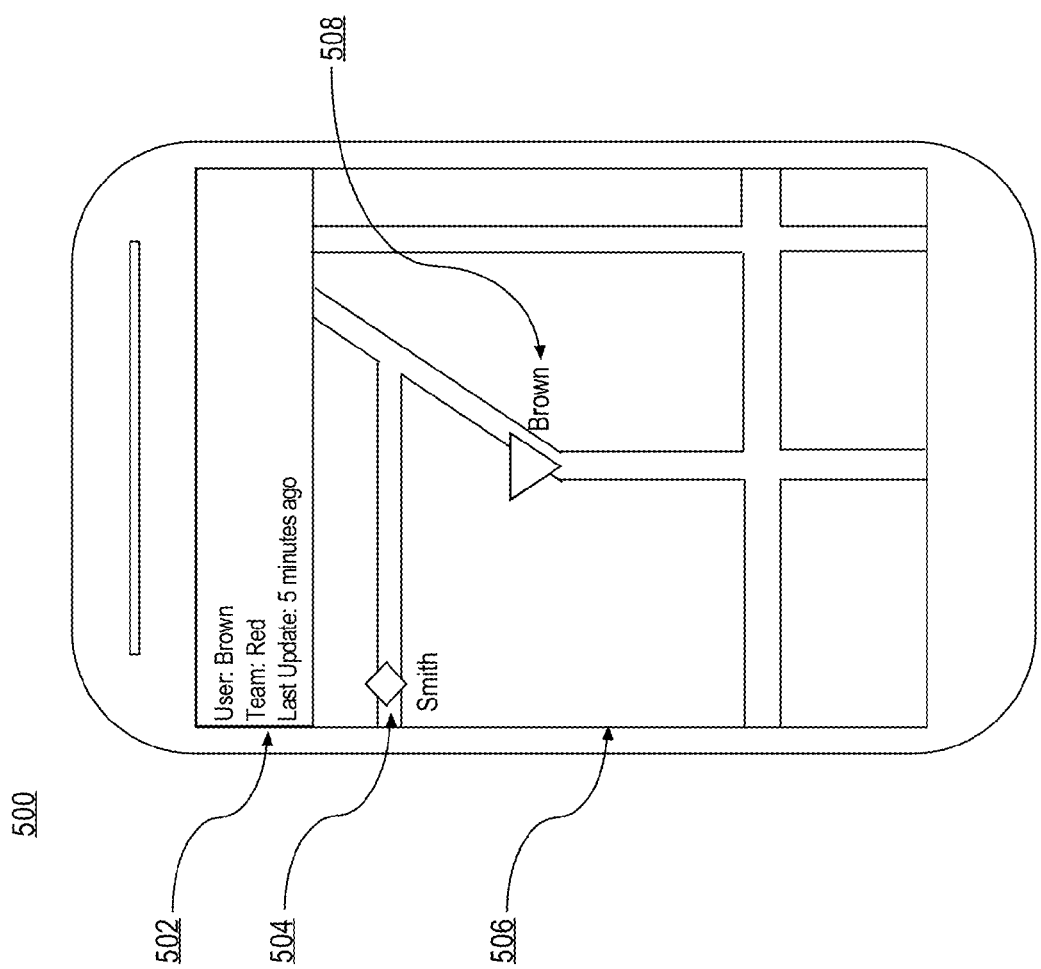
FIG. 5 illustrates an example graphical user interface of a mobile device that is configured to display a location of one or more mobile devices.

FIG. 5 illustrates an example graphical user interface of a mobile device that is configured to display a location of one or more mobile devices. In an embodiment, GUI 500 comprises a mobile device user information panel 502 and a map display 506.

In an embodiment, map display 506 displays a portion of an interactive map including user location icons 504, 508. User location icons 504, 508 indicate an approximate location of two tracked mobile devices associated with mobile device user account indicated by the labels Brown and Smith. Although the example map display 506 displays two user location icons, map display 506 may display any number of mobile device user icons depending on the user's visibility settings, and the number of tracked mobile devices present in the displayed map area at the current map zoom level.

In an embodiment, information panel 502 comprises information related a mobile device user account associated with a currently selected mobile device in map display 506. In the current example, information panel 502 displays information associated with a mobile device user "Brown." The information about mobile device user Brown may be displayed, for instance, in response to a user indicating input selecting user location icon 508 on map display 506 representing mobile device user Brown, selecting the mobile device user's name from a list, typing the mobile device user name into a search box, inputting a voice command, or otherwise indicating a selection of the mobile device user Brown. For example, a different mobile device and mobile device user account may be selected by indicating input selecting another user location icon that is visible on map display 506, such as user location icon 504 representing mobile device user Smith.

Information panel 502 includes additional information about mobile device user Brown, including "last update" information indicating that mobile device user Brown is assigned to a mobile device team identified by the team name "Red." Information panel 502 further provides information indicating how recently location data was received by a mobile device server from the mobile device associated with mobile device user Brown. In this manner, the last update information may provide an indication of the accuracy of the displayed location for a selected mobile device.

In an embodiment, visibility setting information may determine which mobile device teams and mobile device users a particular user is able to view in GUI 500. For example, a user may be using a mobile device and logged in with a particular mobile device user account. The mobile device may send a request for location data of other mobile devices to mobile device server 108 or application server 116 in order to display the location data on map display 506. In response to receiving a request for location data of other mobile devices from the mobile device, mobile device server 108 and/or application server 116 may determine a set of mobile device teams and mobile device users accounts that the requesting mobile device user account has access to view based on mobile device user account visibility settings stored in data repository 118. Mobile device server 108 and/or application server 116 may send back location data for those mobile device teams and mobile device user accounts for which the visibility settings permit access. In this manner, map display 506 may display a user location icon for those mobile devices for which a user has visibility access, and not for those mobile devices for which visibility access has not been granted.

Figure 6:
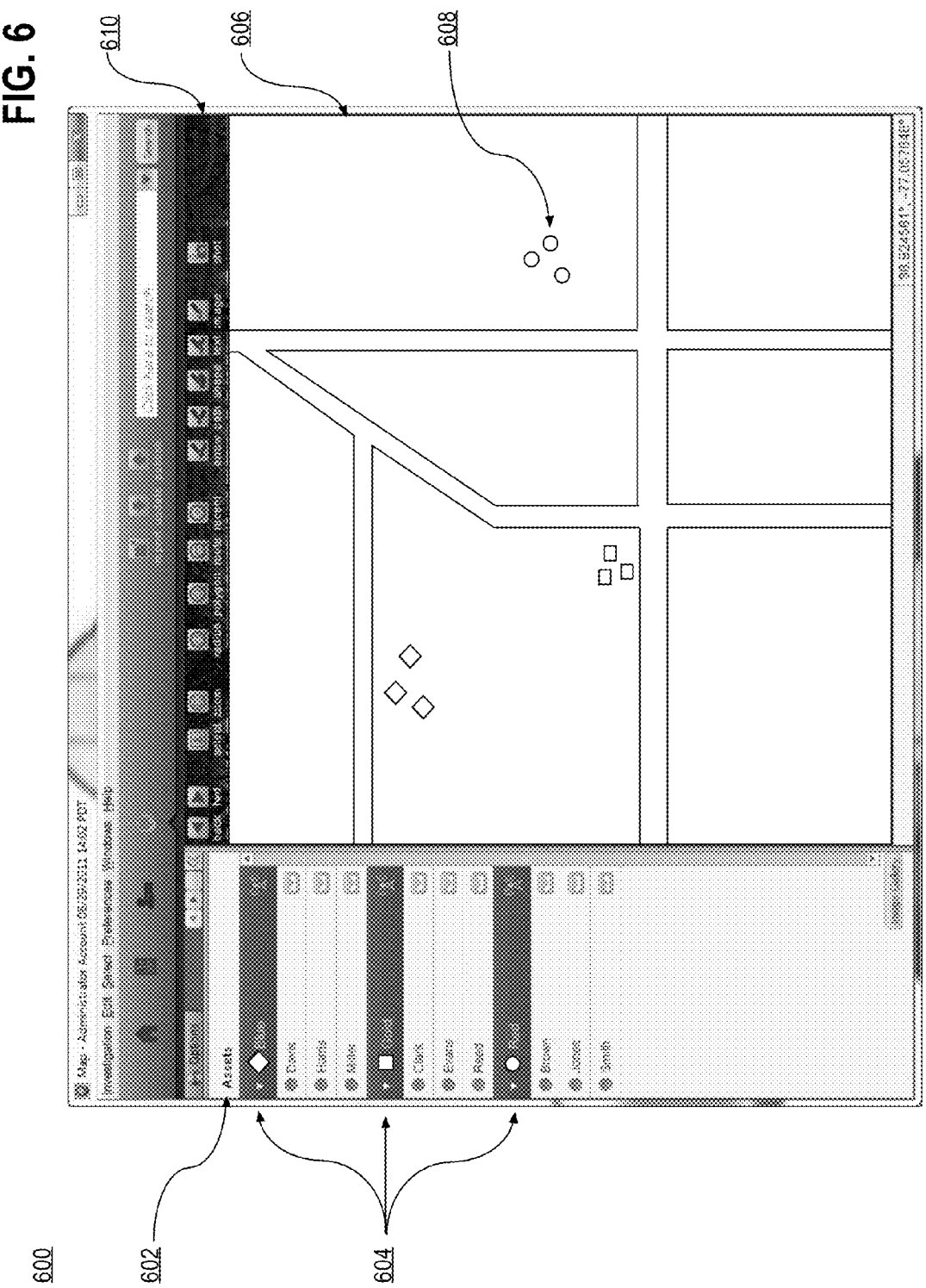
FIG. 6 illustrates an example graphical user interface of an analyst workstation that is configured to display a location of one or more mobile devices.

FIG. 6 illustrates an example graphical user interface of an analyst workstation that is configured to display a location of one or more mobile devices. GUI 600 comprises an assets list 602, mobile device team user lists 604, map display 606, and interface components 610. In an embodiment, GUI 600 generally is configured to display a location associated with one or more mobile device users on a map and the movement of those mobile device users. For example, as a particular mobile device user changes locations, the user's mobile device periodically sends updated location data of the mobile device to a mobile device server and/or application server. The mobile device server and/or application server may then send the updated location data to one or more mobile devices tracking the location of the particular user's mobile device. A map display 606 of the one of the mobile devices receiving the updated location data may be updated based on the received location data. For example, an icon may be displayed on the map for the particular user at an approximate location based on geographic coordinates or other location information included in the received location data.

In an embodiment, assets list 602 displays a list of mobile device teams and mobile device users that the user may view on map display 606. Each of the mobile device team user lists 604 in assets list 602 is configured to display the mobile device user accounts associated with the mobile device team. In an embodiment, the mobile device team user lists 604 shown in assets list 602 may be based on visibility settings stored in data repository 118. Assets list 602 may provide interface elements that enable a user to selectively hide or show particular mobile device teams on the map depending on the user's preferences.

In an embodiment, map display 606 displays one or more user location icons, such as user location icons 608, at a location most recently reported by the associated mobile devices. In the current example, user location icons 608 may correspond to the last known location of the mobile devices associated with the Red mobile device team, as indicated by the matching circle icons in assets list 602 and map display 606. In an embodiment, map display 606 may display information related to an estimated accuracy of the display location data associated with each tracked mobile device user. For example, if a particular mobile device fails to report location data within a specified period of time, an icon of the associated with mobile device user may change in assets list 602 and map display 606, for example, turning from green to yellow to red, and may further provide information indicating the lag time.

In an embodiment, map display 606 may be configured to select an appropriate map centering location and zoom level based on the mobile teams the user has visibility access to and/or teams currently selected from assets list 602. For example, map display 606 may display a map area that is large enough so that each of the selected mobile device team users in assets list 602 is displayed in the map area. An appropriate map zoom level may be determined, for example, by analyzing the location data (e.g., geographic coordinates) to determine a location associated with each of the mobile device user accounts to be displayed and selecting a map centering location and zoom level that includes each of the associated locations. For example, if a first mobile device team includes mobile device user accounts that are located in California, and a second mobile device team includes mobile device user accounts in New York, map display 606 may center on a location between California and New York and display a zoom level that is large enough to simultaneously display the mobile device users in both California and New York.

In FIG. 6, for example, the map currently is zoomed to display an area that includes user location icons for each of the mobile device teams and mobile device user accounts listed in asset list 602. If one or more of the currently displayed user accounts moves to an area that is outside of the currently displayed map view, a mobile device generating map display 606 may be configured to re-center or adjust the zoom level so as to maintain a display view of all selected mobile device teams. As another example, if a user selects one or more additional mobile device teams for viewing in assets list 602, or indicates input hiding one or more of the mobile device teams in assets list 602, map display 606 may be configured to re-center or adjust the zoom level so as to display all selected mobile device teams.

Interface components 610 may enable a user to adjust the current view of map display 606, for example, by zooming in or out, panning, annotating the display, or selecting particular mobile device users or teams to track.

3.5 Mobile Device Messaging

Figure 7:
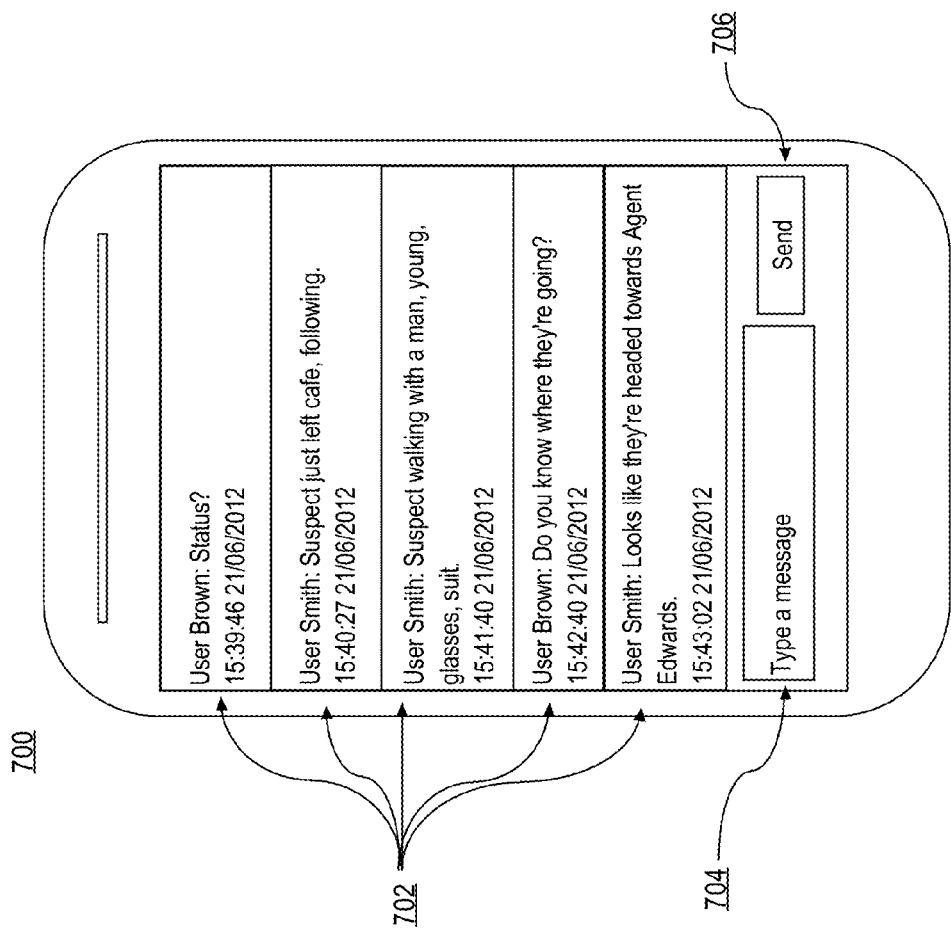
FIG. 7 illustrates an example graphical user interface of a mobile device that is configured to enable messaging between field analysts and between field analysts and operations analysts.

In an embodiment, mobile devices and analyst workstations of the mobile data analysis system may include logic operable to enable field analysts and operations analysts to exchange messages. In general, a message in the mobile data analysis system may comprise, without limitation, any combination of text, images, video, hyperlinks and other markup, other messages, and data objects. FIG. 7 illustrates a GUI 700 of a mobile device that is configured to enable messaging.

GUI 700 comprises messages 702, message input box 704, and message send button 706. In an embodiment, messages 702 provide a transcript of messages that a user of the mobile device has previously sent and received. Each of messages 702 may include information such as, for example, the message content, the name of the user that generated the message, and a timestamp indicating when the message was sent or received. In the current example, messages 702 depict a text conversation between mobile device user accounts labeled as Brown and Smith.

In an embodiment, to send a new message, a user may input message content into message input box 704. A user may input information into message input box 704 including text, multimedia content, and data objects stored on a data repository, or new multimedia content generated by the user using, for example, a camera 210 or voice input.

In an embodiment, selection of the send button 706 may cause message content from message input box 704 to be sent to one or more mobile devices, broadcast to one or more mobile device teams, and/or sent to one or more analyst workstations.

FIG. 8A, FIG. 8B illustrate GUIs 800, 802 that may be implemented on a mobile device for sending multimedia content, such as a digital image, in a message, according to an embodiment. GUI 800 comprises new photo button 804 and image gallery button 806.

A user may select new photo button 804, for example, in order to capture a new digital image using the mobile device using a camera 210. In another embodiment, a mobile device user may select one or more images previously captured and stored on the mobile device by selecting image gallery button 806. Once image gallery button 806 has been selected, for example, a user may be prompted to select one or more digital images stored on the mobile device. The image may also be selected from a data object stored on the data repository.

GUI 808 illustrates a graphical user interface configured to enable a user to send and receive messages including a digital image. GUI 808 includes, for example, a message 810 sent by user Smith. In the example, message 810 comprises a digital image 812 that may have been previously captured by user Smith and attached to message 810. For example, a user may attach a digital image, possibly associated with a data object, to a message using text input box 814 or any other input mechanisms.

3.6 Creating Data Objects from Images

In an embodiment, an operations analyst or other user may desire to create a data object from a digital image captured by a field analyst or other user using a mobile device. FIG. 9 illustrates an example process flow 900 for creating data objects from one or more digital images. In an embodiment, one or more of the steps below may be omitted, repeated, or performed in a different order. The specific arrangement shown in FIG. 9 is not required.

In Step 902, a computing device receives a digital image comprising image metadata. For example, the computing device may be an analyst workstation and the digital image may be sent to the analyst workstation from a mobile device via a network, such as network 112. The digital image may be sent from a mobile device to an analyst workstation as part of a message, attached to an email, as a direct upload, or using any other mechanism of transmitting a digital image. For example, a field analyst using a mobile device may capture an image of a person of interest or a particular location and send the captured image to an analyst workstation in a multimedia message, as described above. In other embodiments, the digital image may be received by querying a stored collection of digital images in a data repository, such as data repository 118.

In an embodiment, a digital image received by the computing device comprises image metadata. The image metadata generally may comprise information about the digital image and include one or more image properties each having an image property value. For example, the image properties may include, without limitation, date and time information, location information, camera manufacturer and camera model number, compression format, camera settings (e.g., exposure time, f-number, etc.), image thumbnails, and mobile device user information. The image metadata may be generated by a camera or mobile device when the digital image is captured and may be stored, for example, as part of a file representing the digital image or stored in a separate metadata file. In one embodiment, the image metadata may comprise data conforming to the exchangeable image file format (EXIF) standard.

In Step 904, the computing device transforms one or more of the image property values of the one or more image properties into one or more particular values. In an embodiment, transforming the one or more image property values may include, for example, reading the image metadata and extracting one or more image property values from the image metadata. Transforming may further comprise reformatting, converting units, combining values, or any other data transformations to one or more of the image property values. For example, transforming may include converting values representing a date and time in one format into another format suitable for storage in a data object of the mobile data analysis system.

In Step 906, one or more data object property values of a data object are populated with the one or more particular values. In an embodiment, the data object may represent a newly generated data object, or a data object already existing in the mobile data analysis system. Populating the one or more data object property values generally may include assigning the transformed particular values to corresponding data object property fields. For example, a particular data object property field may store a value indicating a geographical location and the particular data object property field may be assigned a value obtained from the image metadata indicating a geographical location where the digital image was captured.

In an embodiment, the populated data object may be associated with a particular data object type. For example, default settings may associate the data object with an Event data object type. Depending on the data object type, particular data object property fields may or may not be associated with the data object. For example, a data object of type Event may have a property field indicating an event time, whereas a data object of type Person may not. In an embodiment, a user may change the default data object type and/or modify the data object type currently associated with a particular data object. For example, a data object of type Event may be created from a digital image of an individual, and a user may desire that the data object be changed to a Person type. The user may specify input modifying the data object type to type Person, for example, using one or more graphical user interfaces described herein. Data objects created generally may be associated with any data object types defined in the mobile data analysis system and may include, for example, an event type, a person type, an organization type, a location type, an entity type, and an item type.

In an embodiment, creating a data object from a digital image may further comprise generating one or more links to one or more other existing data objects of a data object graph stored in a data repository, such as data repository 118. For example, using the steps described above in FIG. 9, a data object of type Person may be created from an image depicting an individual known to be affiliated with a particular organization. The particular organization may, for example, be represented by an Organization data object as part of a data object graph stored in data repository 118. An operations analyst or other user may desire to associate the created Person data object with the existing Organization data object in the data object graph. Accordingly, the user may specify input indicating an association between the two data objects, and as a result one or more links may be generated from the Person data object to the Organization data object and the links may be stored in the data repository. For example, the links may be stored as one or more data object property fields of the Person data object and/or Organization data object, or stored as separate link data entities. In one embodiment, the links between the created data object and other existing data objects may be specified by a mobile device user. For example, the mobile device user may specify the links as part of a message that includes the digital image from which the data object is created.

In one embodiment, a data object may be created from two or more digital images. For example, an analyst workstation may receive multiple images from one or more mobile devices that depict the same individual. An operations analyst using the analyst workstation may desire to create a single data object based on the multiple images. In an embodiment, transforming one or more image property values into one or more particular values further comprises generating summary information based on image metadata of the two or more digital images. For example, the metadata of each of the two or more digital images may include a property value indicating a location where the digital image was captured. In one embodiment, transforming the metadata image property values into particular values may include generating a particular location value, the particular location value derived from an average of the location values of the metadata for each of the digital images.

In Step 908, the data object is stored in a data repository. For example, the data object may be stored in a data repository such as repository 118 and made accessible to other field analysts and operations analysts using mobile devices 106 and analyst workstations 114 for further data manipulations.

In some embodiments, creating a data object from a digital image may be performed in response to a user selecting an image for processing, for example, using a GUI 1000 as shown in FIG. 10. GUI 1000 includes an image gallery 1002, a selected image display 1006, a map display 1008, and a data object creation button 1010. For example, GUI 1000 may be used by an operations analyst to view digital images at an analyst workstation that have been received from one or more mobile devices and/or from other sources, and to create data objects from the received digital images.

Image gallery 1002 displays a selection of digital images received by a computing device generating GUI 1000. Digital images displayed in the image gallery 1002 may be filtered and/or sorted to display those images most relevant to a user's interests. For example, GUI 1000 may provide input mechanisms that enable a user to filter the displayed digital images to those uploaded by one or more particular mobile device user accounts or by one or more particular mobile device teams. Digital images displayed in image gallery 1002 may also be sorted by other criteria, for example, by the date and time the digital images were captured, the date and time the images were uploaded, a location associated with the digital images, or any other desirable sorting order.

In an embodiment, a user may select one or more digital images displayed in image gallery 1002 and in response GUI 1000 may provide additional information related to the selected digital images in selected image display 1006 and map display 1008. For example, a digital image selected in image gallery 1002 may be displayed in selected image display 1006 in a larger or higher resolution format. In the present example, Photo 1 from the image gallery 1002 is selected, as indicated by the bolded outline of the image, and an enlarged display of Photo 1 is shown in selected image display 1006.

Map display 1008 includes a map that may display geographic information associated with a selected digital image from image gallery 1002. For example, map display 1008 may that include an icon representing a geographic location where a selected image was captured. For example, a geographic location where one or more selected images were captured may be determined based on information in the associated image metadata for each selected image. If multiple digital images are selected in image gallery 1002, map display 1008 may display multiple icons representing a geographic location associated with each of the selected images. Map display 1008 may be further configured to zoom to an area of the map that includes the location associated with each of the selected images.

In an embodiment, GUI 1000 includes a data object creation button 1010 which, when selected, may cause performance of one or more steps of creating a data object from the currently selected digital images, as described above in further detail with reference to FIG. 9.

Figure 11:
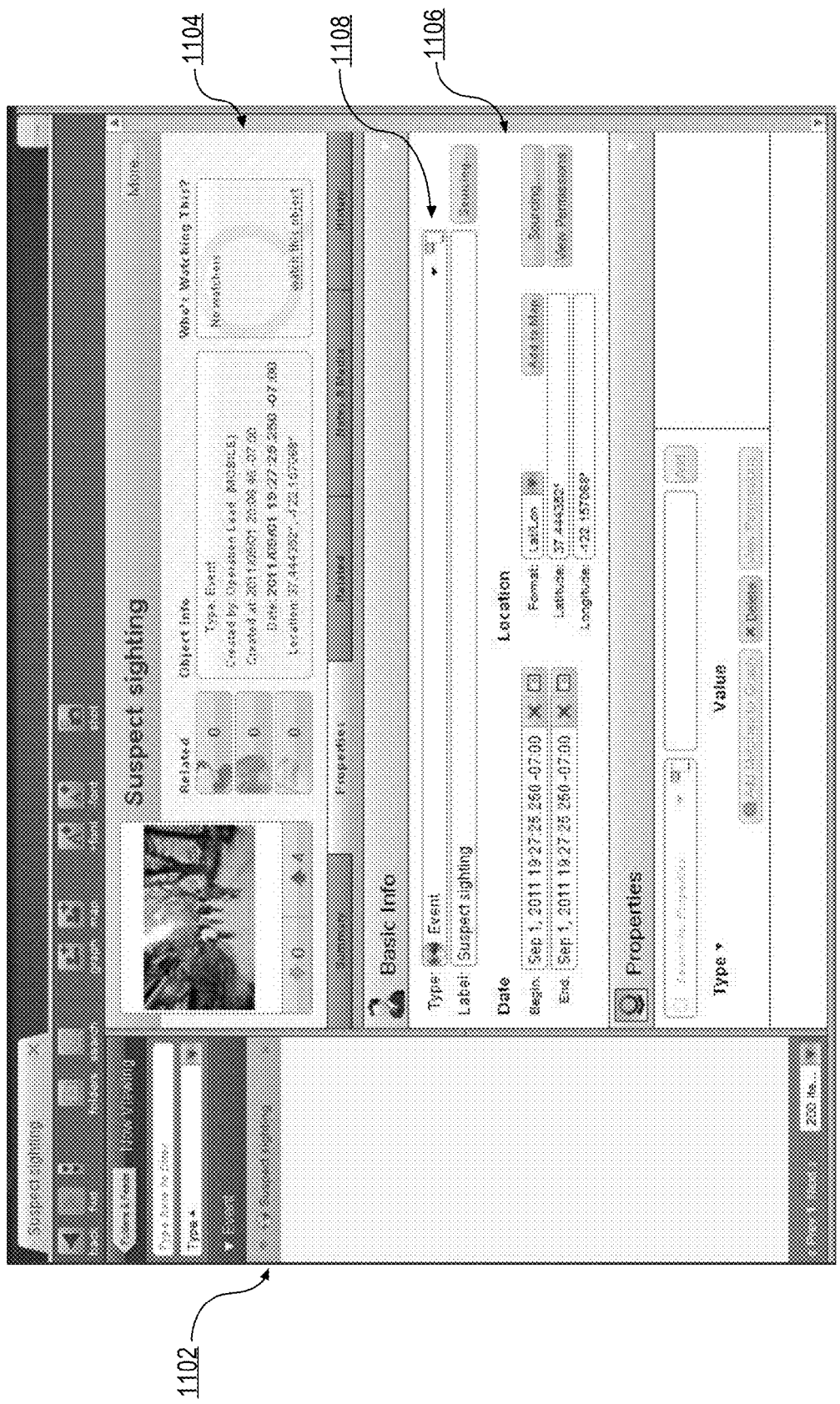
FIG. 11 illustrates an example graphical user interface that is configured to enable a user to modify information associated with a data object.

In some embodiments, GUI 1100 of FIG. 11 may be optionally used to modify information or supply additional information related to a data object created from a digital image. FIG. 11 comprises data object list 1102, data object information panel 1104, and data object property interface elements 1106.

Data object list 1102 displays a list of selectable data objects stored in the mobile data analysis system. The data objects listed in data object list 1102 may include, for example, data objects created during a current user session, or data objects previously created by the user and retrieved from a data repository. The data objects displayed in data object list 1102 may be filtered and stored based on object type, a title associated with object, a user associated with the object, or any other criteria.

Data object information panel 1104 includes information associated with a currently selected data object from data object list 1102. As depicted, data object information panel 1104 displays information for an Event data object labeled "Suspect sighting." Information displayed in data object information panel 1104 includes a display of a digital image associated with the selected data object, information about other related data objects, information about a user that created the data object, when the data object was created, and a location associated with the data object.

Interface elements 1106 are selectable to facilitate modification of the property values of a currently selected data object. For example, object type selector 1108 is a pull-down menu that allows a user to select between different object types that are defined in the mobile data analysis system. Users may modify other data object properties using the interface elements including a label of the data object, date and time information, location information, and data object link information. The interface elements 1106 may depend on the data object type for the selected data object and the particular data object property fields associated with the data object type.

3.7 Mobile Device Search

In an embodiment, mobile device users may search for data objects and other information stored in a centralized data repository, such as data repository 118. For example, a field analyst may desire to search for stored data objects to acquire information about the field analyst's current activities. The field analyst may, for example, be interviewing an individual in the field and desire to know if any information previously has been collected about the individual and stored in the data repository. In an embodiment, the field analyst may specify a search request for information about the individual using a mobile device 106 and the mobile device may send the search request to application server 116 via mobile device server 108. In an embodiment, a mobile device user may specify a search request, for example, by inputting one or more search terms or using a voice command.

In response to receiving a search request from a mobile device, application server 116 may retrieve one or more data object results from data repository 118 that are relevant to the search request. For example, application server 116 may locate data objects in data repository 118 that include one or more of the specified search terms. Application server 116 may send the resulting data objects or other information to the requesting mobile device for display on the mobile device.

Figure 12:
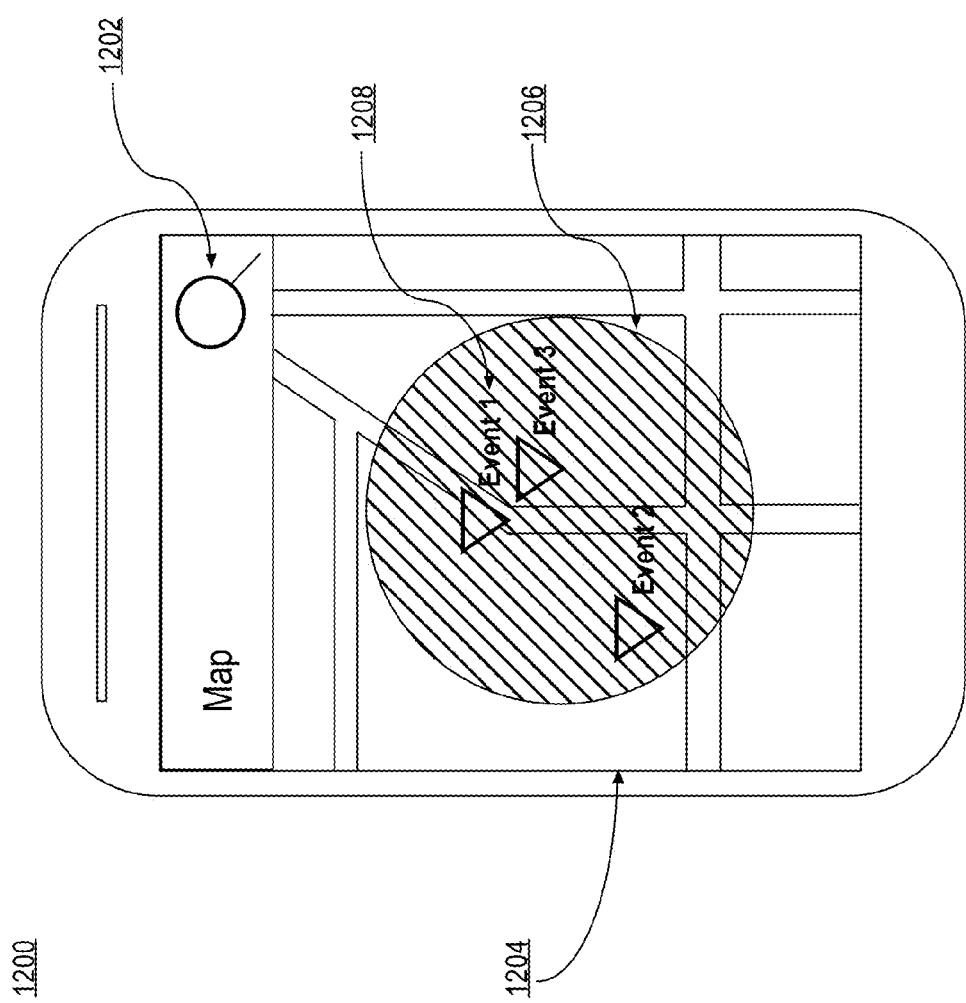
FIG. 12 illustrates an example graphical user interface of a mobile device that is configured to enable a user to submit geosearches.

In one embodiment, mobile device users may specify geosearch requests using a mobile device. In general, a geosearch request is a search request for data objects that are associated with a specified geographic location or area. FIG. 12 illustrates an example GUI 1200 of a mobile device that is configured to enable users to specify a geosearch request.

In an embodiment, GUI 1200 comprises search button 1202 which, when selected, may be configured to enable a user to specify a geosearch request. In one embodiment, mobile device users may specify a geosearch request using map display 1204. For example, a user may specify on map display 1204 a geographic bounding area of interest for the geosearch request. In the current example, bounding area 1206 illustrates an example bounding area for a geosearch request. In the example, the bounding area is depicted as a circle, but other bounding area shapes may be used. The specified geographic bounding area may be used to transmit as part of the geosearch request a set of geographic coordinates or other information that enables application server 116 to determine a geographic area within to search. A geosearch request may include other parameters including a time span desired for result data objects. For example, a user may desire that only Event data objects associated with an event that occurred in the past week be returned.

In response to receiving a geosearch request, application server 116 may determine one or more result data objects in data repository 118 that include location data specifying one or more locations that are within the bounding area specified by the geosearch request. Application server 116 may send the result data objects to the requesting mobile device and the mobile device may display the result data objects on map display 1204. For example, event data object icon 1208 illustrates an example geosearch result data object for a geosearch request specified by bounding area 1206. Event data object icon 1208 may be displayed at a location on the map based on location data stored in association with the data object result corresponding to the displayed icon. In an embodiment, a user may select one or more of the data object result icons on map display 1204 in order to view additional information associated with the data object.

4.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
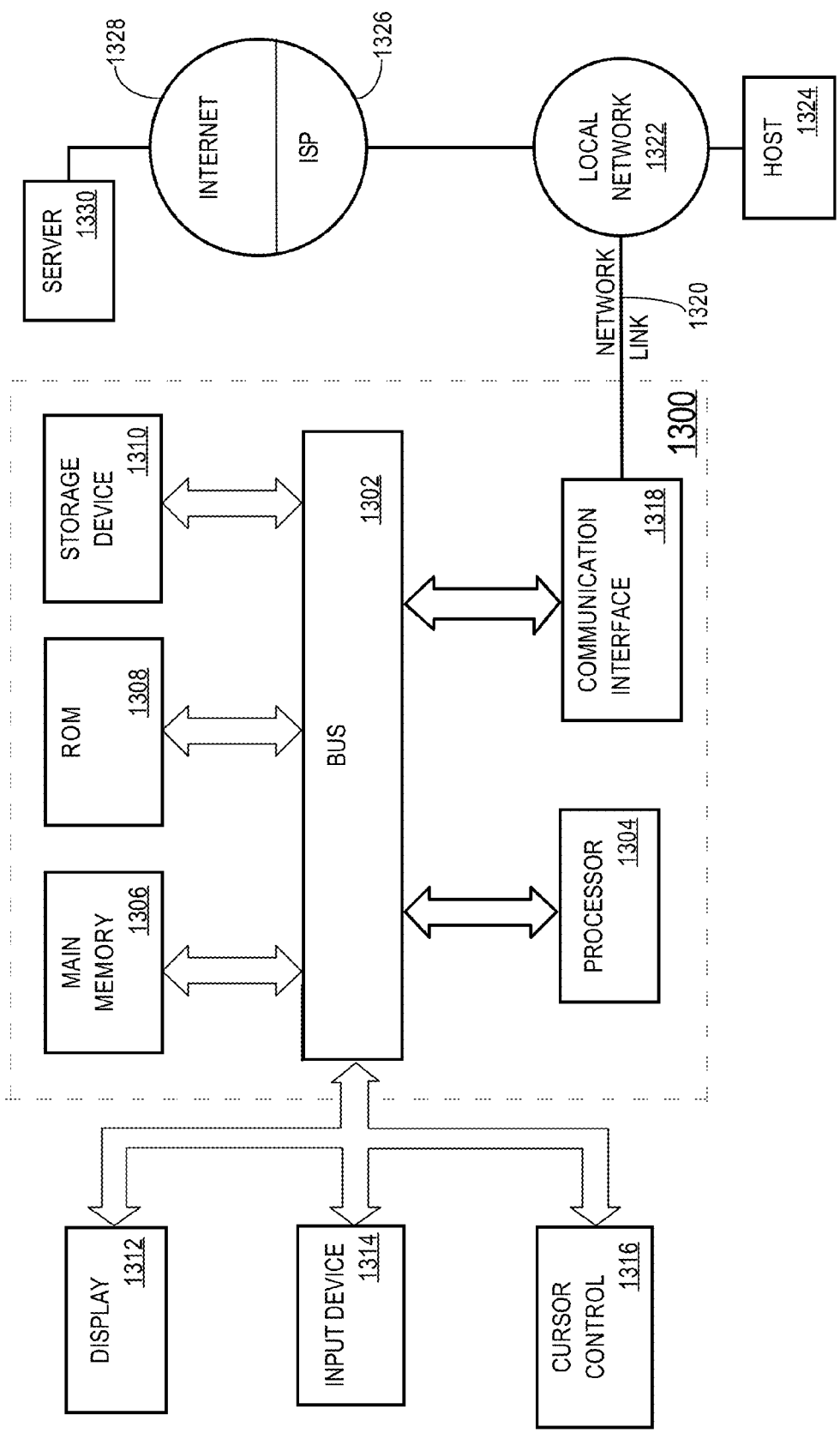
FIG. 13 illustrates a computer system upon which an embodiment may be implemented.

For example, FIG. 13 is a block diagram that illustrates a computer system 1300 upon which an embodiment may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction.

What is claimed is:

1. A computer-implemented method, comprising:
    maintaining, in a data repository of a computing device, an object-centric data model comprising a plurality of data objects, each of which representing a person, place, organization, or event and each of which comprising a plurality of data object property fields;
    receiving, over a network at the computing device, a first digital image comprising first image metadata, wherein the first image metadata includes one or more image properties each having an image property value;
    using digitally programmed logic of the computing device, transforming one or more of the image property values of the one or more image properties into one or more particular values;
    using digitally programmed logic of the computing device, populating one or more data object property fields of a first data object of the plurality of data objects of the object-centric data model with the one or more particular values;
    storing the first data object with the one or more particular values in the data repository of the computing device.

2. The method of claim 1, further comprising receiving the first digital image from a mobile device via a wireless signal.

3. The method of claim 1, further comprising:
    using digitally programmed logic of the computing device, generating one or more links to one or more other existing data objects of a data object graph stored in the data repositoring digitally programmed logic of the computing device, storing the one or more links in association with the data object.

4. The method of claim 3, wherein the one or more links are generated in response to receiving data from a mobile device indicating the one or more links.

5. The method of claim 1, further comprising:
    receiving user input indicating a data object type of the data object;
    storing a value indicating the data object type in association with the data object.

6. The method of claim 5, wherein the data object type is one of an event, a person, an organization, a location, an entity, or an item.

7. The method of claim 1, wherein the one or more image properties include one or more of: date information, time of day information, location information, camera settings information, user information.

8. The method of claim 1, further comprising populating the one or more data object property values of the data object in response to user selection of the digital image.

9. The method of claim 1, further comprising:
    receiving a second digital image comprising second image metadata; and
    wherein transforming one or more of the image property values of the one or more image properties into one or more particular values includes generating summary information based on the first image metadata and the second image metadata.

10. The method of claim 9, wherein the summary information includes a particular location value, the particular location value derived from an average of a first location value associated with the first image metadata and a second location value associated with the second image metadata.

11. A non-transitory computer-readable medium storing one or more sequences of instructions, which when executed by one or more processors, cause the one or more processors to carry out the steps of:
    maintaining an object-centric data model comprising a plurality of data objects, each of which representing a person, place, organization, or event and each of which comprising a plurality of data object property fields
    receiving a first digital image comprising first image metadata, wherein the first image metadata includes one or more image properties each having an image property value;
    transforming one or more of the image property values of the one or more image properties into one or more particular values;

populating one or more data object property fields of a first data object of the object-centric data model with the one or more particular values;

storing the first data object with the one or more particular values in a data repository.

12. The non-transitory computer readable medium of claim 11, wherein the one or more instructions further comprise instructions which, when executed by one or more processors, cause the one or more processors to perform receiving the first digital image from a mobile device via a wireless signal.

13. The non-transitory computer readable medium of claim 11, wherein the one or more instructions further comprise instructions which, when executed by one or more processors, cause the one or more processors to perform:

generating one or more links to one or more other existing data objects of a data object graph stored in the data repository;

storing the one or more links in association with the data object.

14. The non-transitory computer readable medium of claim 13, wherein the one or more links are generated in response to receiving data from a mobile device indicating the one or more links.

15. The non-transitory computer readable medium of claim 11, wherein the one or more instructions further comprise instructions which, when executed by one or more processors, cause the one or more processors to perform:

receiving user input indicating a data object type of the data object;

storing a value indicating the data object type in association with the data object.

16. The non-transitory computer readable medium of claim 15, wherein the data object type is one of an event, a person, an organization, a location, an entity, or an item.

17. The non-transitory computer readable medium of claim 11, wherein the one or more image properties include one or more of: date information, time of day information, location information, camera settings information, user information.

18. The non-transitory computer readable medium of claim 11, wherein the one or more instructions further comprise instructions which, when executed by one or more processors, cause the one or more processors to perform populating the one or more data object property values of the data object in response to user selection of the digital image.

19. The non-transitory computer readable medium of claim 11, wherein the one or more instructions further comprise instructions which, when executed by one or more processors, cause the one or more processors to perform:

receiving a second digital image comprising second image metadata; and wherein transforming one or more of the image property values of the one or more image properties into one or more particular values includes generating summary information based on the first image metadata and the second image metadata.

20. The non-transitory computer readable medium of claim 19, wherein the summary information includes a particular location value, the particular location value derived from an average of a first location value associated with the first image metadata and a second location value associated with the second image metadata.

* * * * *